W. H. MAHLOW.
VEHICLE TIRE.
APPLICATION FILED MAY 1, 1911.

1,003,280.

Patented Sept. 12, 1911.

Witnesses
M. P. Nichols
C. L. Weed

Inventor
William H. Mahlow
by Seymour & Earle
Frederic C. Earle
Attys

COLUMBIA PLANOGRAPH CO., WASHINGTON, D. C.

UNITED STATES PATENT OFFICE.

WILLIAM H. MAHLOW, OF WEST HAVEN, CONNECTICUT.

VEHICLE-TIRE.

1,003,280. Specification of Letters Patent. Patented Sept. 12, 1911.

Application filed May 1, 1911. Serial No. 624,472.

*To all whom it may concern:*

Be it known that I, WILLIAM H. MAHLOW, a citizen of the United States, residing at West Haven, in the county of New Haven and State of Connecticut, have invented a new and useful Improvement in Vehicle-Tires; and I do hereby declare the following, when taken in connection with the accompanying drawings and the letters of reference marked thereon, to be a full, clear, and exact description of the same, and which said drawings constitute part of this specification, and represent, in—

Figure 1:
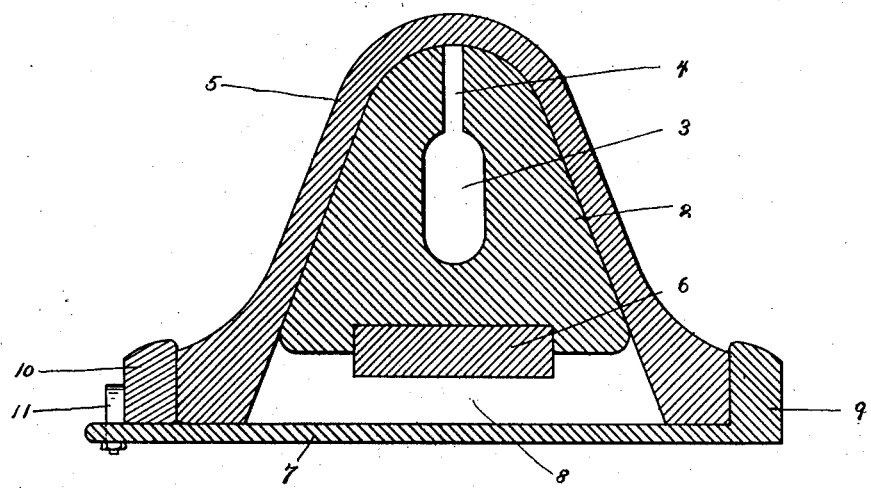
Figure 2:
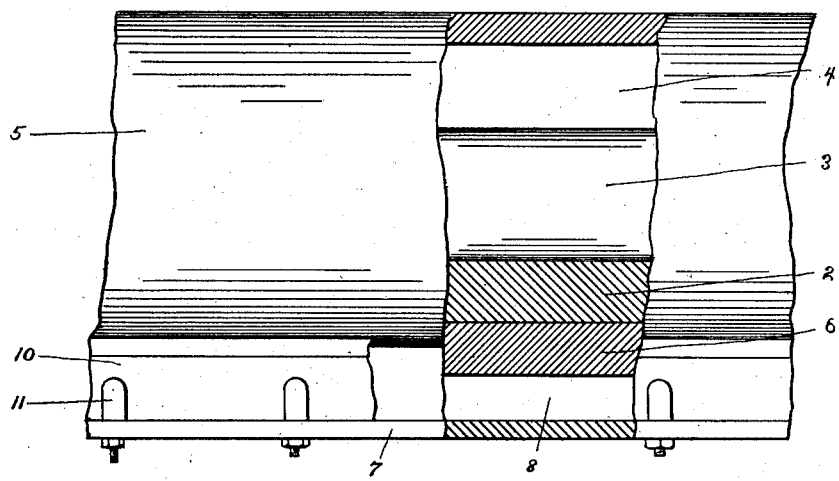

Figure 1 a transverse sectional view of a wheel tire constructed in accordance with my invention. Fig. 2 a broken longitudinal sectional view of the same.

This invention relates to an improvement in vehicle tires, and particularly tires for automobiles and other heavy vehicles, the object of the invention being to provide a cushion tire as distinguished from a pneumatic tire, and one in which the strain on the tire is equalized; and the invention consists in the construction hereinafter described and particularly recited in the claim.

In carrying out my invention I employ an inner tire 2 molded from rubber and pyramidal in cross-section, with a centrally arranged chamber 3 and an annular slot 4 extending from the periphery into the opening 3. This inner tire 2 is inclosed by a suitable shoe 5 and the inner tire rests upon a steel band 6 larger in diameter than the diameter of the rim 7 so as to leave a space 8 between the band and the rim. The rim may be of any preferred form, preferably of the detachable type, and as herein shown is formed on one side with a fixed flange 9, and the opposite side with a removable flange 10 held in place by bolts 11. By employing the steel band the inner tire is expanded and the strain of the load is transferred from the bottom of the wheel to the top, or in other words, equalized.

I claim:—

A wheel tire comprising a shoe and an inner tire the inner tire molded from rubber and formed with a centrally arranged chamber, and an annular slot opening from the center of the outer edge of the inner tire into said chamber.

In testimony whereof, I have signed this specification in the presence of two subscribing witnesses.

WILLIAM H. MAHLOW.

Witnesses:
ROBERT LAURENSON,
ROBERT M. SCHWANER.

Copies of this patent may be obtained for five cents each, by addressing the "Commissioner of Patents, Washington, D. C."